United States Patent
Tomas

(10) Patent No.: US 7,539,182 B2
(45) Date of Patent: May 26, 2009

(54) SIGNALLING IN A TELECOMMUNICATIONS NETWORK

(75) Inventor: Christian Fredrik Mecklin Tomas, Kyrkslatt (FI)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1376 days.

(21) Appl. No.: 10/220,879

(22) PCT Filed: Jan. 22, 2001

(86) PCT No.: PCT/EP01/00660

§ 371 (c)(1), (2), (4) Date: Sep. 5, 2002

(87) PCT Pub. No.: WO01/67683

PCT Pub. Date: Sep. 13, 2001

(65) Prior Publication Data

US 2003/0031137 A1 Feb. 13, 2003

(30) Foreign Application Priority Data

Mar. 8, 2000 (GB) .................................. 0005426.2

(51) Int. Cl.
*H04L 12/50* (2006.01)
(52) U.S. Cl. ..................... 370/373; 370/236; 370/270; 370/525; 370/522; 370/377
(58) Field of Classification Search .............. 370/395.2, 370/252, 395.52, 385, 496, 493, 254, 255, 370/401, 465, 466, 469, 474, 352–356, 263, 370/360, 331, 236, 270, 522, 377, 373; 455/414.3, 455/436; 379/229, 35, 414–417, 333–349, 379/33

See application file for complete search history.

(56) References Cited

U.S. PATENT DOCUMENTS

| 5,787,253 | A | 7/1998 | McCreery | |
|---|---|---|---|---|
| 6,490,451 | B1* | 12/2002 | Denman et al. | 455/436 |
| 6,754,180 | B1* | 6/2004 | Christie | 370/236 |
| 6,832,254 | B1* | 12/2004 | Scoggins et al. | 709/227 |

FOREIGN PATENT DOCUMENTS

WO   EP 0 652 519 A   5/1995

OTHER PUBLICATIONS

Cuervo et al. "Megaco Protocol", Jan. 2000, Internet Engineering Task Force Internet Draft; pp. 1-143.*

Cuvero et al.; "Megaco Protocol", 2000; Internet Engineering Task Force, pp. 1-143.*

(Continued)

*Primary Examiner*—Ricky Ngo
*Assistant Examiner*—DeWanda Samuel

(57) ABSTRACT

A method of monitoring information associated with a given termination of a Context defined for a Media Gateway (MG) of a telecommunications network. The method comprises specifying an additional Topology Descriptor to define the relationship between a monitoring termination and a monitored termination, the descriptor including a parameter (dir) defining whether only information arriving at the monitored termination from outside of the Context, or only information arriving at the monitored termination from inside of the Context, or both is to be sent to the monitoring termination.

10 Claims, 2 Drawing Sheets

OTHER PUBLICATIONS

Mogul J C: "Network Locality at the Scale of Processes" Proceedings of the Conference on Communications Architectures and protocols (Sigcomm), US, New York, ACM, vol. SYMP. 21, Sep. 3, 1991, pp. 273-284, XP000301959, paragraph '03.2! .

Pavlou G, et al: "Intelligent Remote Monitoring" Proceedings of the International Conference on Intelligence in Broadband Services and Networks, De, Berlin, Springer, vol. Conf. 3, Oct. 16, 1995, pp. 430-444, XP000593493, ISBN: 3-540-60479-0, paragraph '0004!; figure 4.

* cited by examiner

SIGNALLING IN A TELECOMMUNICATIONS NETWORK

FIELD OF THE INVENTION

The present invention relates to signalling in a telecommunications network and in particular to signalling in a telecommunications network in which network signalling points are split into a call control part and a bearer control part.

BACKGROUND TO THE INVENTION

Telecommunications networks currently rely to a large extent upon Signalling System No.7 (SS7) as the mechanism for controlling call connections and for handling the transfer of signalling information between signalling points of the networks. Typically, one or more application and user parts at a given signalling point will make use of SS7 to communicate with peer application and user parts at some other signalling point. Examples of user parts are ISUP (ISDN User Part) and TUP (Telephony User Part) whilst examples of application parts are INAP (Intelligent Network Application Part) and MAP (Mobile Application Part). The conventional SS7 protocol stack includes Message Transfer Parts MTP1, MTP2, and MTP3 which handle the formatting of signalling messages for transport over the physical layer as well as various routing functions. Both signalling and user data is carried over Synchronous Transfer Mechanism (STM) networks using either the E.1 (Europe) or T.1 (USA) systems. In some cases a common STM network is used for both signalling and user data whilst in other cases separate STM networks are used.

There has been considerable interest of late amongst the telecommunications community in using non-standard (i.e. non-conventional within the telecommunications industry) signalling and user data transport mechanisms in telecommunications networks in place of the conventional mechanisms. The reasons for this are related both to improvements in efficiency as well as potential cost savings. Much consideration has been given for example to the use of ATM (AAL1/2/5) and Internet Protocol (IP) networks to transport signalling and user data between network nodes. ATM and IP networks have the advantage that they make efficient use of transmission resources by using packet switching and are relatively low in cost due to the widespread use of the technology (as opposed to specialised telecommunication technology).

ISUP, which deals with the setting-up and control of call connections in a telecommunications network, is closely linked to the E.1/T.1 STM transport mechanisms and does not readily lend itself to use with non-standard transport technologies such as IP and ATM. As such, several standardisation bodies including the ITU-T, ETSI, and ANSI, are currently considering the specification of a signalling protocol for the control of calls, which is independent of the underlying transport mechanism. This is illustrated in FIG. 1 and can be viewed as separating out from the signalling protocol those Bearer Control functions which relate merely to establishing the parameters (including the start and end points) of the "pipe" via which user plane data is transported between nodes, and which are specific to the transport mechanism. The new protocol, referred to as Bearer Independent Call Control (BICC) or Transport Independent Call Control (TICC), retains Call Control functions such as the services invoked for a call between given calling and called parties (e.g. call forwarding), and the overall routing of user plane data. It is noted that signalling traffic at the Call Control level may be sent over a network (IP, ATM, SS7, etc) which is separate from the network over which Bearer Control signalling traffic and user data is sent. However, in some cases a single shared network may be used. As well as TICC, alternative transport independent call control protocols exist including SIP.

The new network architecture resulting from the separation of the Call and Bearer Control levels results in an open interface appearing between a Call Control entity and a Bearer Control entity, where these entities are referred to as a Media Gateway Controller and a Media Gateway respectively. The open interface may be referred to as a Gateway Control Protocol (GCP), examples of which are the MEGACO work of the IETF (MegacoP) and the H.248 work of ITU Study Group 16 (SG16) as well as MGCP. It is envisaged that a given Media Gateway Controller may control several Media Gateways (or indeed a Media Gateway may be controlled by several Media Gateway Controllers).

In the GCP there are defined protocol elements which correspond to respective network accesses, e.g. a timeslot, and elements which correspond to respective connections (between terminations). For example, in H.248 these elements are referred to respectively as "terminations" and "Contexts". These same terms will be used hereinafter although it will be appreciated that different terms may be used in different GCPs, e.g. MGCP uses the terms "endpoint" and "connection". A single termination can carry several different "streams", each stream carrying one distinct type of information, e.g. speech or data. The streams within a given Context are related by the use of a "StreamId". A stream consists of a uni- or bi-directional flow of data.

As implied above, a Context represents a connection between two or more terminations in one MG. By default, all terminations within a Context are connected to each other so that all terminations "listen" to all of the other terminations within a Context. The topology of a Context is defined so that the relation between two terminations (which can be identified by a "wildcard" operator) is described, i.e. Ta,Tb,Relation. The relation may be oneway (bi-directional), bothways (unit-directional), or isolated. The Topology Descriptor is conventionally a property of the Context and is maintained at the level of the MGC.

There are circumstances in which appropriate authorities may wish to monitor the calls and connections made by a given telephone subscriber. For this purpose, the unidirectional relation will be assigned to the Context at the MGC level which connects the termination allocated to the monitoring authority to the termination allocated to the subscriber to be monitored. Consider the situation where $T_A$ (termination A) represents subscriber A, $T_B$ (termination B) represents subscriber B, and $T_C$ (termination C) represents subscriber C. Assume that subscriber B is to be monitored, but that the legal warrant does not extend to the monitoring of any other parties (namely subscribers A and C), and that a conference call is setup between the three subscribers as illustrated in FIG. 2.

In the call, which is a multimedia conference, both speech and data are involved. In each termination there are two streams, one for speech and one for data. Monitoring is to be performed on subscriber B, but only on speech, and only on what B says, not on what A or C says. To be able to do this, a new termination $T_{mo}$ must be included in the Context. When a connection is desired only to B, a topology needs to be described, i.e. $T_B$, $T_{mo}$, oneway, in which $T_B$ is the "from" termination and $T_{mo}$ is the "to" termination. In the above Context, Stream1 carries speech and Stream2 carries data. From the perspective of $T_B$, Stream1 listens to everything that comes in from either A or C and sends everything that B says to A and C.

SUMMARY OF THE PRESENT INVENTION

With the above topology, i.e. $T_B$, $T_{mo}$, oneway, everything on Stream1 is conveyed to $T_B$, i.e. not only what comes to $T_B$ from subscriber B. This may be illegal in some countries where only one subscriber can be monitored, not the others. This problem has been recognised and solved by the inventor of the present invention.

It is an object of the present invention to enable the flexible monitoring of calls in a telecommunications system, whereby only information originating from a subscriber, or information originating from a subscriber and received by that subscriber, may be monitored. This and other objects are achieved by specifying for a given topology, associated with a termination to be monitored, a directional parameter indicating the direction of traffic to be monitored.

According to a first aspect of the present invention there is provided a method of monitoring information associated with a given termination of a Context defined for a Media Gateway (MG) of a telecommunications network, the method comprising specifying an additional Topology Descriptor to define the relationship between a monitoring termination and a monitored termination, the descriptor including a parameter defining whether only information arriving at the monitored termination from outside of the Context, or only information arriving at the monitored termination from inside of the Context, or both is to be sent to the monitoring termination.

It will be appreciated that the present invention is applied in the context of a telecommunications network in which the call control and bearer control levels are separate, and where the MG of the bearer control layer is controlled by a Media Gateway Controller (MGC) of the Call Control level.

Preferably, said Topology Descriptor is of the form $T_B$, dir, $T_{mo}$, relation, where $T_B$ is the termination to be monitored, $T_{mo}$ is the monitoring termination, dir is the parameter defining whether only information arriving at the monitored termination $T_B$ from outside of the Context, or only information arriving at the monitored termination $T_B$ from inside of the Context, or both is to be sent to the monitoring termination $T_{mo}$. Relation indicates whether information is sent uni-directionally from $T_B$ to $T_{mo}$, or bidirectionally between the two terminations. Typically, for monitoring operations, Relation defines a uni-directional connection.

Preferably, said Topology Descriptor is specified at the MGC and is sent to the MG using the Gateway Control Protocol (GCP), e.g. H.248 or MegacoP. This can either be done during the creation of a new Context, or as part of the modification of an existing Context.

According to conventional architectures, the Topology Descriptors are properties of a given context and are maintained at the level of the MGC. It may in some circumstances be advantageous to change a Topology Descriptor from a Context property to a termination property. In this way, when a monitored termination is transferred from a first Context to a second Context, e.g. during a handover or call waiting operation, the monitoring operation is maintained without the need to additionally transfer the monitoring termination from the first to the second Context. Associating Topology Descriptors with terminations rather than Contexts means that the descriptors are maintained at the MG level rather than at the MGC level. This allows monitoring operations to be performed at a more local level.

According to a second aspect of the present invention there is provided a telecommunications system comprising a Media Gateway (MG) at the Bearer Control level and a Media Gateway Controller (MGC) at the Call Control level for controlling the MG, said MGC comprising means for specifying a Topology Descriptor to define the relationship between a monitoring termination and a monitored termination, the descriptor including a parameter defining whether only information arriving at the monitored termination from outside of the Context, or only information arriving at the monitored termination from inside of the Context, or both is to be sent to the monitoring termination, and means for sending said Topology Descriptor to the MG to form part of a Context within the MG, and said MG comprising means for receiving said Topology Descriptor and for creating the defined topology within said Context.

According to a third aspect of the present invention there is provided a method of monitoring information associated with a given termination of a Context defined for a Media Gateway (MG) of a telecommunications network, the method comprising specifying an additional Topology Descriptor to define the relationship between a monitoring termination and a monitored termination, the Topology Descriptor being a property of the monitored termination.

DETAILED DESCRIPTION OF CERTAIN EMBODIMENTS

Figure 1:
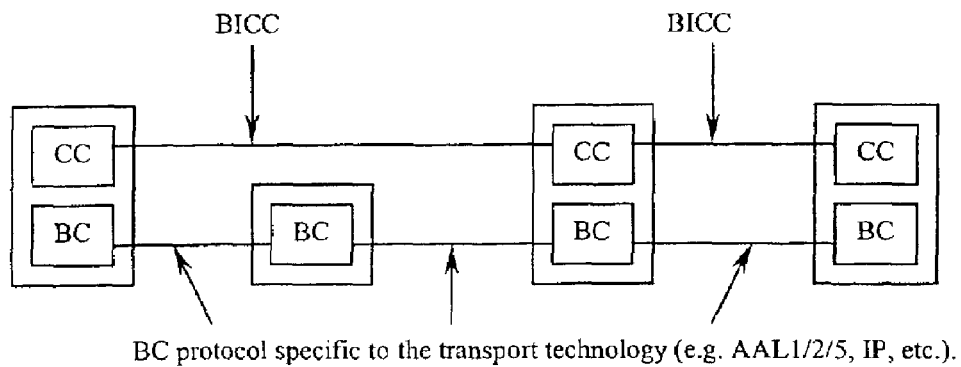
FIG. 1 illustrates a telecommunications network in which the Call Control level is independent of the Bearer level.
Figure 2:
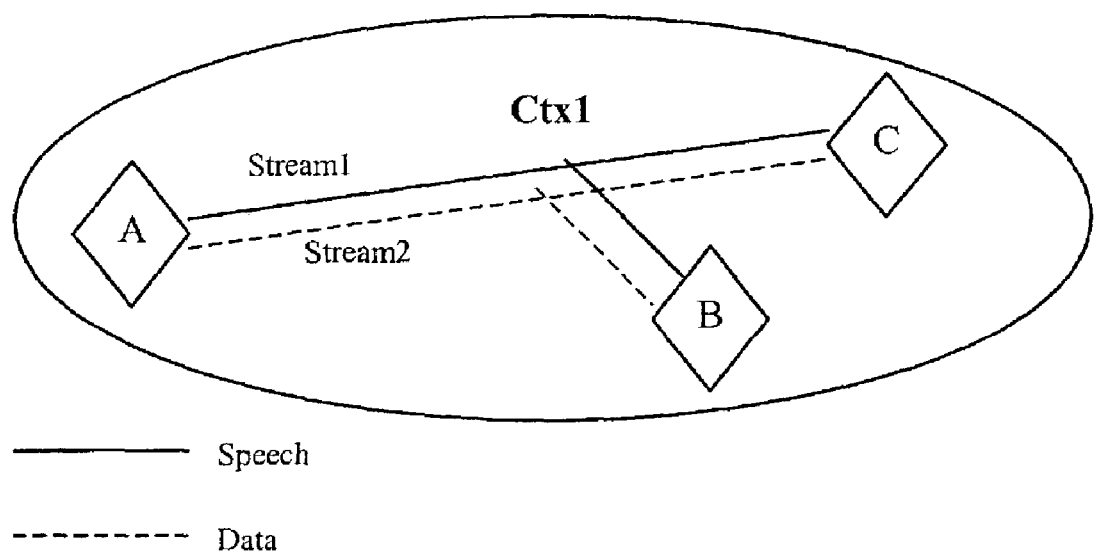
FIG. 2 illustrates a scenario in which three subscribers are involved in a conference call.

FIG. 1 illustrates in very general terms a telecommunications network 10 in which signalling points are split into Media Gateway Controllers (MGCs) and Media Gateways (MGs), where the MGCs exist at a Call Control (CC) 20 layer and the MGs exist at a Bearer Control (BC) 30 layer. A single MGC may control one or several Media Gateways. As has also been described above, the MGC controls the MG to set up appropriate connections to peer MGs over the bearer traffic transport network. The GCP protocol (e.g. H.248) used by the MGC to control the MG specifies "Terminations" and "Contexts" within the MG (step 120, FIG. 3). The problems arising when the monitoring of a subscriber is required have been illustrated with reference to FIG. 2.

Terminations represent one or more user data flows into or out of the MG whilst Contexts represent connections between Terminations. In particular, a Context comprises one or more Topology Descriptors which define the relationships between terminations. Thus, using the example of FIG. 2, the relationship between terminations A 40 and B 50 may be defined by the Topology Descriptor $T_A$, $T_B$, relation, where relation in this example is bi-directional. Similar Topology Descriptors define the relationships between terminations $T_A$ and $T_C$, and $T_B$ and $T_C$.

Figure 3:
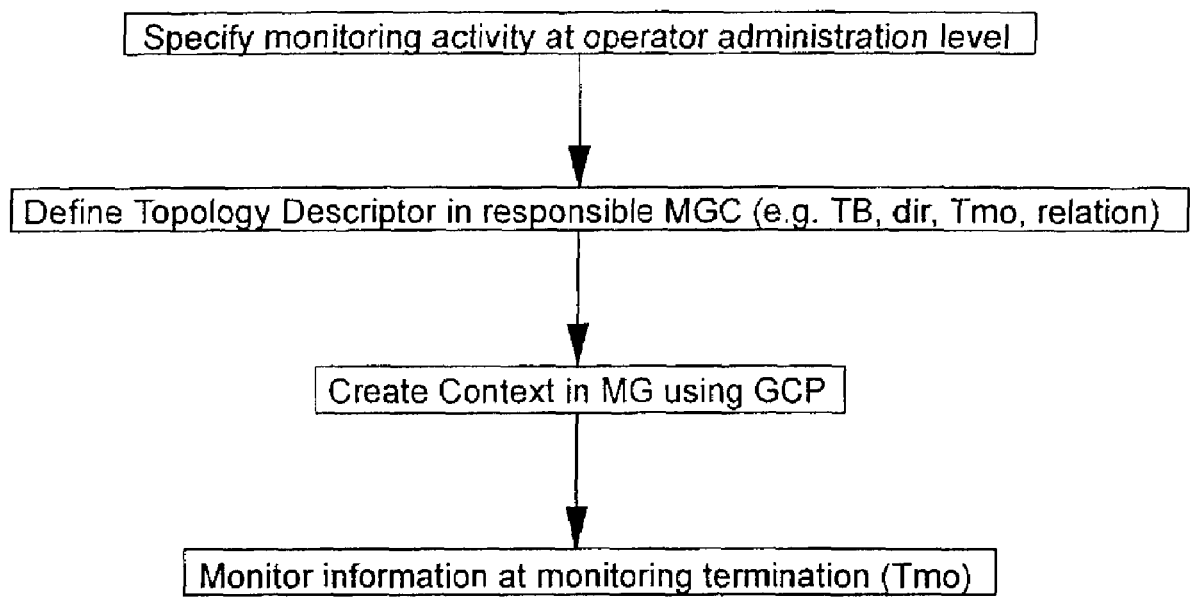
FIG. 3 is a flow diagram illustrating a method of monitoring a subscriber involved in the conference call of FIG. 2.

If the appropriate authorities wish to monitor, for example, the calls (either speech or data) made by a subscriber B connected to termination B 50, then a new termination $T_{mo}$ must be added to the Context, and a Topology Descriptor generated to define the relationship between $T_{mo}$ and $T_B$ (step 100, FIG. 3). It is likely that the relation for this Topology Descriptor will define a oneway (i.e. uni-directional) connection from $T_B$ to $T_{mo}$ (step 110, FIG. 3). However, in the absence of any other limitations, this Topology Descriptor will cause all information on stream1 (assuming that the stream1 ID is associated with the monitoring termination) to be conveyed from $T_B$ to $T_{mo}$.

An additional parameter dir is therefore included into the Topology Descriptor to define which information is to be conveyed from $T_B$ to $T_{mo}$. The three possible definitions are: (a) only information arriving at $T_B$ from outside of the Context, i.e. from subscriber B; (b) only information arriving at $T_B$ from within the Context, i.e. from terminations $T_A$ and $T_C$; and (c) both (a) and (b). If (a) is defined, then only the voice of subscriber B will be monitored. If (b) is defined, then only the voices of subscribers A and C will be monitored, whilst if (c) is defined then the voices of all three participating subscribers will be monitored. The modified Topology Descriptor will have the form $T_B$, dir, $T_{mo}$, relation.

FIG. 3 is a flow diagram further illustrating the method of monitoring a termination as described above.

The embodiment of the invention described above assumes a substantially conventional MG/MGC "architecture" in which the Topology Descriptors are Context properties and are defined and maintained at the MGC level (step 110, FIG. 3). There may however be advantages in changing the Descriptors, at least where they relate to monitoring operations, from Context properties to Termination properties. This would allow the monitoring activities to be carried out at the MG level which tends to be more local than the MGC level (step 130, FIG. 3). Termination properties also tend to be easier to handle than Context properties as the former are local to a piece of equipment whilst the latter tend to span several functions.

It will be appreciated by the person of skill in the art that various modifications may be made to the above described embodiment without departing from the scope of the present invention.

The invention claimed is:

1. In a telecommunications network, a method of monitoring information associated with a monitored termination of a Context, the Context comprising two or more terminations in a Media Gateway (MG), the method comprising:

specifying, at a media gateway controller a modified Topology Descriptor of the Context so as to define a relationship between a monitoring termination and the monitored termination, the modified Topology Descriptor having an additional parameter to define which information is to be conveyed from the monitored termination to the monitoring termination, the additional parameter indicating whether only information arriving at the monitored termination from outside of the Context, or only information arriving at the monitored termination from inside of the Context, or both is to be sent to the monitoring termination; and the media gateway controller providing said modified Topology Descriptor to said Media Gateway, associated with said monitored termination, wherein the modified Topology Descriptor is used to create a new Context at the Media Gateway that causes the arriving information to be sent from the monitored termination to the monitoring termination.

2. A method according to claim 1, wherein said telecommunications network is a network in which the call control and bearer control levels are separate, and where the MG of the bearer control layer is controlled by a Media Gateway Controller (MGC) of the Call Control level.

3. A method according to claim 1, wherein said modified Topology Descriptor is of the form $T_b$, dir, $T_{mo}$, and relation parameters, wherein said $T_b$ parameter identifies the monitored termination, said $T_{mo}$ parameter identifies the monitoring termination, said dir parameter specifies whether only information arriving at the monitored termination from outside of the Context, or only information arriving at the monitored termination from inside of the Context, or both is to be sent to the monitoring termination as indicated by said $T_b$ parameter, and wherein said relation parameter indicates whether information is sent uni-directional from said monitored termination to said monitoring termination or bi-directional between said monitored termination and said monitoring termination.

4. A method according to claim 2, wherein said step of specifying said modified Topology Descriptor is performed at the MGC and said step of providing said modified Topology Descriptor is performed by sending said Topology Descriptor to said MG over a Gateway Control Protocol (GCP).

5. A method according to claim 2, wherein said modified Topology Descriptor is a property of said context and is maintained at the level of the MGC.

6. A telecommunications system comprising:

a Media Gateway (MG) at the Bearer Control level and a Media Gateway Controller (MGC) at the Call Control level for controlling the MG, the MGC comprising:

means for specifying a modified Topology Descriptor of a Context to define a relationship between a monitoring termination and a monitored termination, the modified Topology Descriptor having an additional parameter defining which information is to be conveyed from the monitored termination to the monitoring termination, the parameter indicating whether only information arriving at the monitored termination from outside of the Context, or only information arriving at the monitored termination from inside of the Context, or both is to be sent to the monitoring termination; and means for sending said modified Topology Descriptor to the MG to form part of a new Context within the MG, wherein the Topology Descriptor causes the arriving information to be sent from the monitored termination to the monitoring termination.

7. The telecommunications system of claim 6 wherein said modified Topology Descriptor further includes $T_b$, dir, $T_{mo}$, and relation parameters, wherein said $T_b$ parameter identifies the monitored termination, said $T_{mo}$ parameter identifies the monitoring termination, said dir parameter specifies whether only information arriving at the monitored termination from outside of the Context, or only information arriving at the monitored termination from inside of the Context, or both is to be sent to the monitoring termination as indicated by said $T_b$ parameter, and wherein said relation parameter indicates whether information is sent uni-directional from said monitored termination to said monitoring termination or bi-directional between said monitored termination and said monitoring termination.

8. The telecommunications system of claim 7 wherein said means for specifying said modified Topology Descriptor is located within said MGC.

9. The telecommunications system of claim 6 wherein said MG further comprises means for receiving said modified Topology Descriptor from said MGC.

10. The telecommunications system of claim 6 wherein said modified Topology Descriptor is maintained at the level of the MGC.

* * * * *